Patented July 19, 1932

1,867,970

UNITED STATES PATENT OFFICE

ANTHONY JAMES HAILWOOD, WILLIAM JOHNSON SMITH NAUNTON, AND ARNOLD SHEPHERDSON, OF MANCHESTER, ENGLAND, ASSIGNORS TO IMPERIAL CHEMICAL INDUSTRIES LIMITED, OF LONDON, ENGLAND

MEANS OF INTRODUCING CHEMICALS INTO RUBBER OR CELLULOSIC MATERIALS

No Drawing. Application filed September 27, 1928, Serial No. 308,875, and in Great Britain October 7, 1927.

It is known in the art that films of rubber can be electrically produced from latex by the utilization of what is known as cataphoresis; the migration of negatively charged rubber particles to the anode when an electric field is imposed on the latex. The phenomenon is not due to electrolysis and with highly conductive solutions the phenomenon is obscured. In various processes proposed in the prior art for the production of rubber films from latex in this manner it has not proved practicable to simultaneously deposit with the rubber various organic chemicals and materials desirable for producing color effects or advantageous in subsequent vulcanization of the deposited rubber such as dyes, vulcanization accelerators. The difficulty with these prior propositions for the most part has been the introduction into the latex of excessive quantities of electrolytes. With the addition of strongly dissociated electrolytes to the latex there is a heightening conductivity which is undesirable and also with these strongly dissociated materials there is a tendency toward the evolution of oxygen on the anode and in the mass of the rubber. This not only causes sponginess but is detrimental to the rubber.

In the Sheppard et al. Patent 1,580,795 an attempt has been made to overcome this defect. In this patent there is added to the bath various reducing agents the purpose of these agents being to combine with the oxygen at the anode and thereby prevent the oxygen from acting on the rubber. The preferred reducing agents are inorganic salts of sulphite or like sulphur compounds. Unfortunately these inorganic compounds are more or less strongly dissociated and have a tendency toward increasing the evolution of oxygen with which they subsequently react. There are also mentioned in the patent a few organic reducing substances. However, in all cases the reducing agent acts merely as a depolarizer and their functioning is to combine with the oxygen as soon as it is generated.

We have found that there are certain weak electrolytes, that is electrolytes which are only feebly dissociated, which may be introduced into the latex without interfering with the cataphoric action and without leading to the evolution of oxygen; and with the aid of these feebly ionizing materials, which are of organic nature, we can not only produce a rubber film at the anode by cataphoric action but can also co-deposit therewith by electrolytic action, certain bodies which are advantageous adjuncts to the rubber.

We have found that by adding soluble alkali metal salts of organic compounds of the class consisting of organic thiol compounds and leuco dyestuff compounds, the said salts of organic compounds having the probable formula $R-(X-M)_n$ wherein $R$ represents organic residue of the organic thiol or leuco dyestuff compound, $X$ represents S or O, $M$ represents an alkali metal and $n$ is 1 or 2, to rubber latex and then imposing an electric potential on an anode in said mixture, there is simultaneously codeposited at the anode a body of rubber having uniformly and intimately distributed throughout the same, the desired organic chemical. The body of rubber is deposited from the rubber latex by cataphoresis and the organic compound is formed and deposited by electrolytic action. When organic compounds of the above type are added to water or an aqueous emulsion, they are feebly ionized giving rise to anions and cations, the anions derived in this way are organic anions. When an electric potential is applied to the admixture of rubber latex and the organic compounds some current will flow. Under the influence of the electric current the organic anions migrate to the anode, where they give up their charge and are converted into other organic compounds which are deposited at the anode with the rubber which is being simultaneously deposited by cataphoric action.

The choice of the particular organic compound or compounds to be used is dependent upon the desired compound which is to be formed and deposited with the rubber. Vulcanization accelerators or dyestuffs, or both, may be incorporated into the rubber films very advantageously by the present method. To produce a vulcanization accelerator one has but to select as a starting compound the organic chemical which ionizes to give the particular organic anion which upon discharge at the anode will be converted into the vulcanization accelerator. Thus for example organic compounds containing the thio group $-SH$ or $-SNa$ attached to the organic residue may be used, when such compounds are ionized to give an organic anion having sulphur attached to the organic residue. In this case when such organic anion is discharged at the anode two of them immediately combine to form dithio compounds having two of the corresponding organic residues linked through two sulphur atoms. Organic dithio compounds of this type form an advantageous class of vulcanization accelerators. The deposited organic compound is formed by electrolytic oxidation at the time the corresponding organic anion is discharged at the anode.

Organic dyes may be incorporated into the rubber in a similar way. The leuco derivative of a vat dyestuff in the form which will furnish the proper organic anion may be used.

The present invention is not limited only to production of rubber films from rubber latex or other aqueous dispersions of rubber, but it is applicable to aqueous dispersion of other alkali organic materials. It is applicable to other aqueous dispersions of organic materials, such as balata, gutta percha, and analogous vegetable resins, from which the said organic material may be deposited by a cataphoric action when an electric potential is applied to said aqueous emulsion. It may be applied to the incorporation of organic chemicals into rubber, rubber-like substances, cellulose, cellulose esters and derivatives and other alkali substances which may be deposited from their aqueous solutions at an anode by cataphoresis. In using rubber latex, such addenda as activators, fillers, conditioning agents, softeners, protective colloids, etc., may or may not be added as is desired.

To illustrate more clearly and specifically the technical value of our invention, we will consider the introduction of the known vulcanization accelerator tetraethyldithiuramdisulphide, into the rubber film. It has been found that, on solution in water, the sodium salt of diethyl-dithiocarbamic acid ionizes according to the scheme

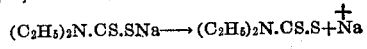

On submitting the mixture to the electrolytic process, the positively charged sodium ion proceeds to the cathode, whilst the negatively charged diethyldithiocarbamic ion proceeds to the anode and is there discharged according to the equation:

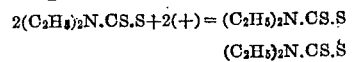

giving the tetraethylthiuramdisulphide which is a valuable accelerator. When this is carried out in the presence of rubber latex then the tetraethylthiuramdisulphide is deposited in the rubber mass.

Another valuable effect our invention exhibits is its use in the introduction of vat dyestuffs into the rubber mix at the anode. We have found that the colour ions of the leuco derivatives of vat dyestuffs, which, it will be observed satisfy the generalized condition given above, are negatively charged and travel in an electric field towards the anode, being discharged there to the dyestuff. The following scheme explains the probable mechanism for the case of leuco indigo in weakly alkaline solution.

The sodium salt of leuco indigo ionizes according to the scheme:

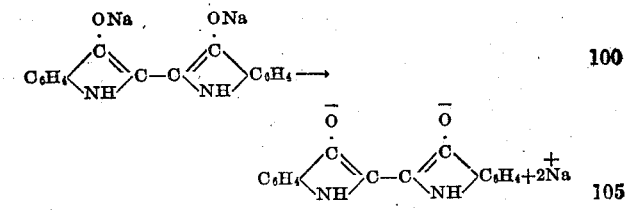

and the doubly charged indigoid ion is discharged at the anode to indigo thus:

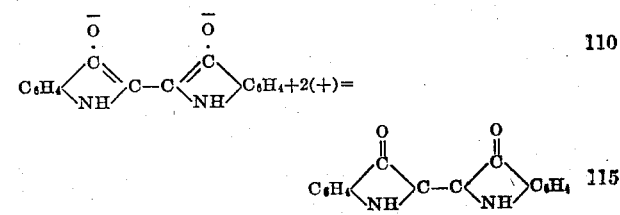

Other examples of this type which we may mention are the deposition of $p'$-benzoquinone at the anode when hydroquinone is used in the electrolytic cell or any leuco compound of a vat dyestuff no matter to what series it may belong, or the oxidation of a mercaptan to the corresponding disulphide. A great advantage of the invention is that the oxidized product liberated, e. g. dyestuff or accelerator is uniformly distributed throughout the rubber film in an extremely fine state of division. Another valuble effect of our invention is that sulphur need not necessarily be used in the latex bath, since as is well known, many disulphides such as the thiuram disulphides will vulcanize rubber in the absence of free sulphur. Thus, by employing according to our invention an organic substance which is liberated in the rubber film as a disulphide of the above type, the well known difficulty of obtaining an even and regular deposition of sulphur is overcome.

Our invention is obviously not limited to the illustrations just mentioned, nor to the example which follows. It may be applied to ordinary rubber latex or to a partly or wholly vulcanized latex, with or without addition of suitable fillers, conditioning agents, softeners etc. By rubber latex we include the latex from balata gutta percha, and analogous vegetable resins. This is usually used as an ammoniacal suspension but we also include specially prepared latex made by increasing the protective colloids present and in some cases then evaporated or concentrated. The rubber latex may also be wholly or partly replaced by cellulose, cellulose esters or other cellulosic compounds.

With regard to the chemicals to be deposited with the latex etc. these may be applied in the form of salts if desired. An essential novelty in our invention is that the dye, accelerator etc. is not directly applied as such but in a form which is subsequently converted by electrolytic means upon the discharge of an organic anion into the effective dye, accelerator, etc., and this conversion is automatically carried out when the chemical is simultaneously deposited with the rubber or other film.

*Example.*—In a bath as employed for the electro-deposition of rubber, that is to say, one containing latex, zinc oxide, protective colloid etc. there is dissolved two per cent. of sodium diethyldithiocarbamate on the dry rubber content of the latex and a film of rubber is deposited on the anode by the passage of a current of electricity in the usual way. After stripping and drying this film it can be cured in a few minutes at comparatively low steam pressures. A similar method may be adopted when using a metal salt of a leuco vat dye and the latter may be used in conjunction with an accelerator-producing substance.

What we claim and desire to secure by Letters Patent is:—

1. The process of incorporating organic chemicals into a body of rubber deposited from its aqueous emulsion at an anode by cataphoresis which comprises admixing sodium diethylthiocarbamate with rubber latex, imposing an electric potential on an anode in said admixture and thereby simultaneously codepositing at an anode the said body of rubber and tetraethylthiuramdisulphide whereby the deposited tetraethylthiuramdisulphide is uniformly and intimately distributed throughout the body of rubber.

2. The process of incorporating organic chemicals into a body of rubber deposited from its aqueous emulsion at an anode by cataphoresis, which comprises admixing with rubber latex a sodium salt of dialkyl-dithiocarbamate and a sodium salt of leuco indigo, imposing an electric potential on an anode in said admixture and thereby simultaneously co-depositing of rubber, tetra-alkyl-thiuram disulphide and the indigo dyestuff.

In testimony whereof we affix our signatures.

ANTHONY JAMES HAILWOOD.
WILLIAM JOHNSON SMITH NAUNTON.
ARNOLD SHEPHERDSON.